V. JOHNSON.
BEET TOPPER.
APPLICATION FILED OCT. 29, 1909. RENEWED FEB. 20, 1911.
995,350.
Patented June 13, 1911.
2 SHEETS—SHEET 2.
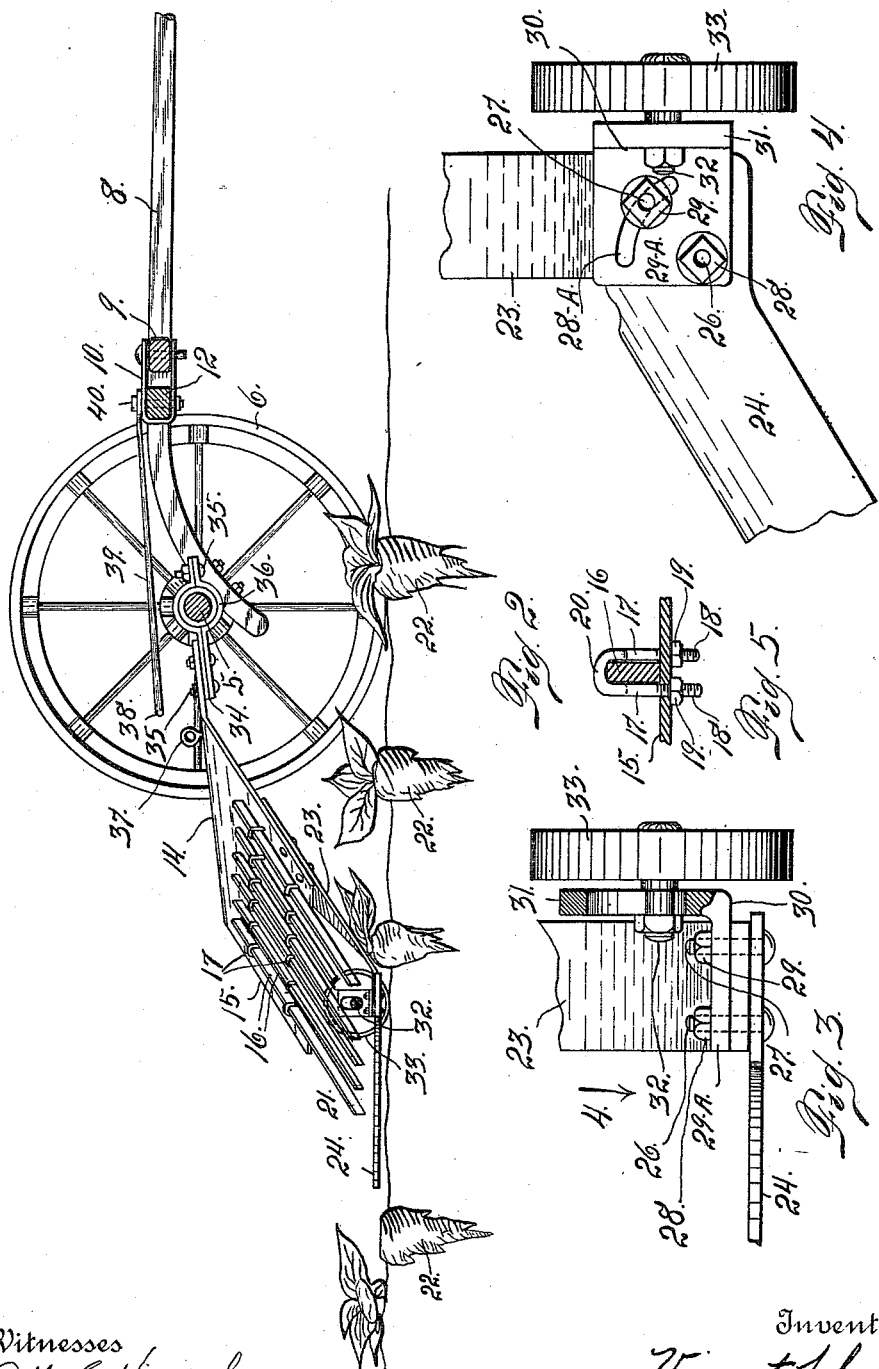

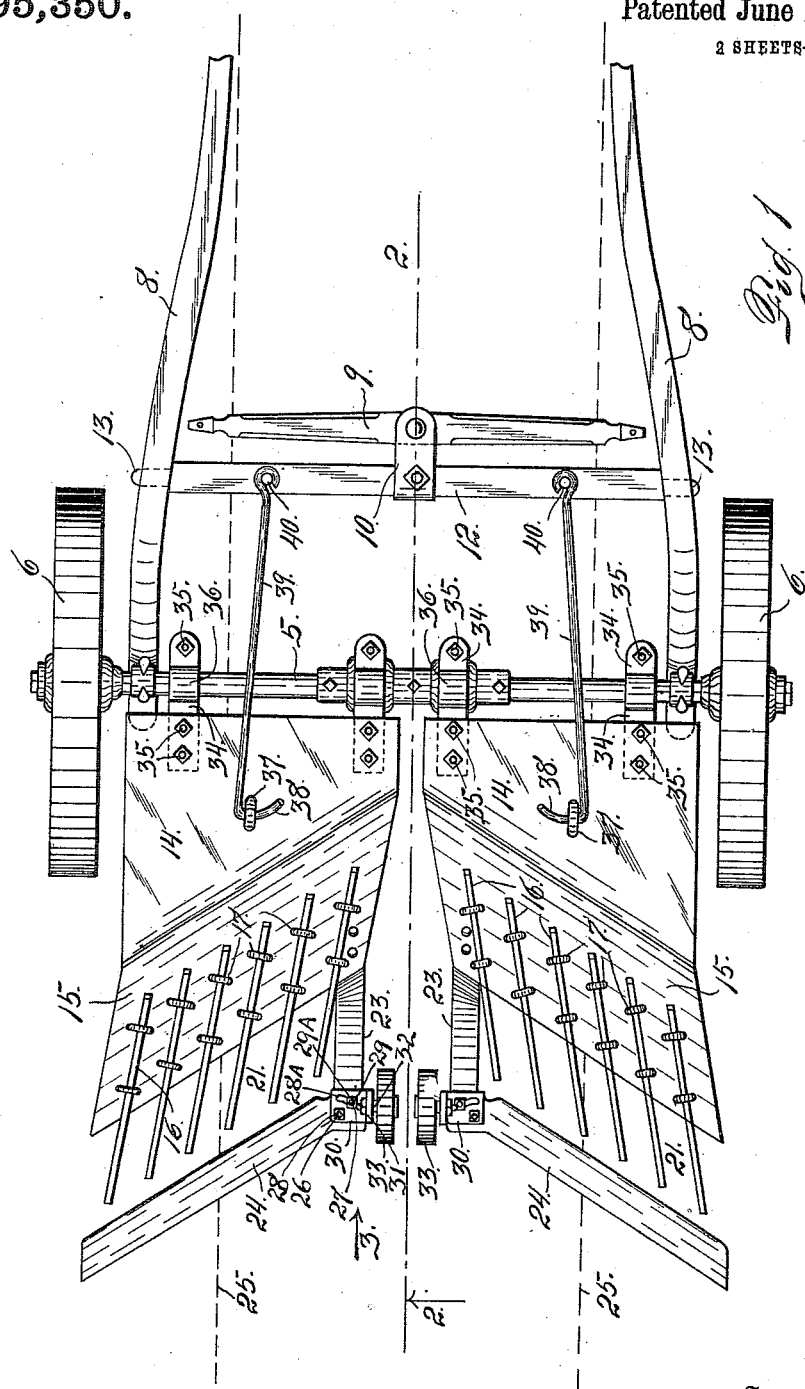

UNITED STATES PATENT OFFICE.

VINCENT JOHNSON, OF ASPEN, COLORADO, ASSIGNOR TO THE JOHNSON IMPLEMENT COMPANY, OF DENVER, COLORADO, A CORPORATION OF COLORADO.

BEET-TOPPER.

995,350. Specification of Letters Patent. Patented June 13, 1911.

Application filed October 29, 1909, Serial No. 525,282. Renewed February 20, 1911. Serial No. 609,739.

*To all whom it may concern:*

Be it known that I, VINCENT JOHNSON, a citizen of the United States, residing at Aspen, county of Pitkin, and State of Colorado, have invented certain new and useful Improvements in Beet-Toppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in beet toppers, my object being to provide an implement of this class adapted to remove the tops of beets, or similar vegetables, while in the ground in such a manner that the cutting shall be at the proper place regardless of the height to which the beets project above the ground.

Great difficulty has been experienced heretofore in providing a machine to properly top beets, owing to the fact that these vegetables do not protrude an equal distance aboev the ground, and it therefore results that if the tops are all cut in the same plane, some will be cut too high and others too low.

The object of my improvement is to overcome this difficulty, and to this end my improved machine is constructed to automatically adjust the knife in a vertical direction according to the varying height of the beets above the ground, the mechanism in front of the knives being constructed to produce this result.

As illustrated in the drawing, the machine is adapted to top two rows of beets, and constructed to be drawn by a single horse who travels between the rows. The machine is equipped with an axle supported by two ground wheels, the draft shafts being connected with the axle. Mounted to swing upon the axle are two plates having rearwardly projecting fingers adapted to engage the beets as the machine is drawn over the field. Located in the rear of the rear extremities of the said fingers, are knives which are connected with the said plates and therefore rise and fall with the latter. By virtue of the fact that the fingers protrude rearwardly from the plates between the rear edges of the plates and the knives, the plates and consequently the knives, are caused to oscillate vertically as the individual beets in the row vary in height above the surface of the ground. By virtue of this fact the knives are automatically adjusted to sever the beet tops in the proper place, regardless of the variation in height above the surface of the ground.

Having briefly outlined my improved construction, I will proceed to describe the same in detail, reference being made to the accompanying drawing, in which is illustrated an embodiment thereof.

In this drawing: Figure 1 is a top plan view of my improved beet topper. Fig. 2 is a vertical section taken on the line 2—2, Fig. 1, looking in the direction of the arrow. Fig. 3 is a fragmentary rear detail view, looking in the direction of arrow 3, Fig. 1, the parts being shown on a larger scale. Fig. 4 is a top plan view of the same. Fig. 5 is an enlarged detail view, showing the manner of securing the gage fingers in position.

The same reference characters indicate the same parts in all the views.

Let the numeral 5 designate the axle; 6 the ground wheel; 8 the draft shafts; and 9 the whiffletree supported by a clip 10 attached to a crossbar 12, whose extremities are secured to the draft shafts, as shown at 13.

Located in the rear of the axle are two plates 14, which are diagonally and downwardly inclined in a rearward direction, as shown at 15. These downwardly-deflecting, inclined members 15 are each equipped with a series of fingers 16, which are connected with the plate member 15, by bolts 17, whose threaded extremities 18 pass through the plates and are secured in place by nuts 19, located below the plates. The upper extremities of these bolts are hook-shaped, as shown at 20, to engage the fingers 16, whereby the latter may be held securely in place. It is evident, however, that by loosening the nuts 19, the fingers may be adjusted lengthwise or removed and new ones substituted, if occasion should require. The fingers 16 protrude rearwardly beyond the inclined members 15 of the plates, as shown at 21. These rearwardly-protruding portions of the fingers are arranged to engage the beets 22, whereby the plates which are connected with the axle to oscillate thereon, are caused to rise and fall, as the individual beets of the row vary in height above the ground.

Connected with each plate member 15 by a rearwardly-projecting arm 23, is a knife 24, which occupies a position forming oblique angles with the line of travel of the machine. In Fig. 1 the parallel dotted lines 25 are intended to indicate the position of the two rows of beets to be topped, as the machine is drawn over the field. By virtue of the fact that the knives form oblique angles with the direction of the travel of the machine, the said knives perform the beet topping function by a shearing action.

Each knife is connected with the rear extremity of its corresponding arm 23, by means of two bolts 26 and 27. The knife is arranged to swing upon the bolt 26 when the nuts 28 and 29 of the two bolts are loosened. The bolt 26 therefore forms a sort of pivot for the beet topping knife. The bolt 27, however is fixedly connected with the knife and adapted to travel in a curved slot 28^A formed in the member 29^A of an angle plate 30 which is secured to the rear extremity of the arm 23 by means of the two bolts 26 and 27. The angle plate 30 has an upwardly-projecting member 31 to which is secured a stub axle 32, upon which a sort of caster-wheel 33 is journaled. These wheels 33 support the plates 14, together with the knives 24, a short distance above the surface of the ground when the machine is drawn thereover. It must be understood that these wheels are not intended to regulate in any way the adjustment of the knives to the various planes required in order to perform the beet topping function, but are only employed to give a sort of support to the rear portion of the machine when drawn over the ground when not in use. It is evident that when the knives are raised by the engagement of the fingers 21, with beets which protrude a considerable distance above the surface of the ground, the wheels 33, as well as the knives, will be raised.

Each plate 14 is provided at its forward edge with a sort of clip 34, composed of two members which are connected by bolts 35 to form a sort of box or bearing 36 which turns freely on the axle 5. By virtue of this construction, the plates 14, together with the knives 24, are free to oscillate vertically, as circumstances may require, assuming that the fingers are caused to engage beets, or other vegetables, which protrude from the ground unequal distances.

When the machine is not in use, the plates 14, together with their attachments, may be lifted a considerable distance above the ground, wherefore eyes 37 carried by the plates 14 are adapted to be connected with the hook-shaped rear extremities 38 of the rods 39 whose forward extremities are pivotally connected, as shown at 40, with the crossbar 12 of the thills or shafts. When so adjusted the said plates, together with the knives, are raised far enough above the ground to avoid injury.

Having thus described my invention what I claim is:

1. In a beet topper, the combination with an axle and ground wheels, of a plate connected with the axle at its forward extremity to oscillate vertically, the said plate having a portion downwardly inclined and equipped with fingers extending beyond its rear edge, and a knife connected with the plate and located in the rear of the said fingers.

2. In a beet topper, the combination with an axle and ground wheels, of a plate connected with the axle at its forward extremity to oscillate vertically the said plate having a portion downwardly inclined and equipped with fingers removably connected with the plate and extending beyond its rear edge, and a knife connected to oscillate with the plate and located in the rear of the fingers.

3. In a construction of the class described, the combination with an axle and ground wheels, of a plate connected with the axle to oscillate vertically, the said plate having a portion downwardly inclined, the rear edge of the plate extending obliquely to the direction of the machine's travel, a knife connected with the plate to oscillate therewith, the knife being separated from the plate, located in the rear thereof and extending substantially parallel with the plate's rear edge, and fingers mounted on the plate and projecting rearwardly thereof into the space separating the plate and the knife.

4. In a construction of the class described, the combination with an axle and ground wheel, of a plate connected with the axle to oscillate vertically, the said plate having a portion downwardly inclined, the rear edge of the plate extending obliquely to the direction of travel, a knife connected with the plate located in the rear thereof and separated therefrom, the knife extending substantially parallel with the rear edge of the plate, fingers mounted on the plate and projecting rearwardly thereof into the space separating the plate and the knife, and ground wheels forming a support for the plate and knife to prevent the latter coming in contact with the ground when not in use.

In testimony whereof I affix my signature in presence of two witnesses.

VINCENT JOHNSON.

Witnesses:
 JESSIE F. HOBART,
 ALBERT O'BRIEN.

---

Copies of this patent may be obtained for five cents each, by addressing the "Commissioner of Patents, Washington, D. C."